(12) United States Patent
Barber (10) Patent No.: US 8,831,798 B1
(45) Date of Patent: Sep. 9, 2014

(54) SYSTEMS AND METHODS FOR POSITIONING A HEADING-BASED IMAGE WITHIN A TRACK-BASED IMAGE AND FOR GENERATING STEERING COMMANDS TO A STEERABLE FORWARD-LOOKING IMAGE CAPTURE DEVICE OF AN ENHANCED VISION SYSTEM

(75) Inventor: Sarah Barber, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 314 days.

(21) Appl. No.: 13/246,239

(22) Filed: Sep. 27, 2011

(51) Int. Cl.
| | |
|---|---|
| G01C 23/00 | (2006.01) |
| G06T 15/30 | (2011.01) |
| G06T 7/00 | (2006.01) |
| G06T 19/00 | (2011.01) |
| G01C 21/00 | (2006.01) |

(52) U.S. Cl.
CPC . *G01C 23/00* (2013.01); *G06T 7/00* (2013.01); *G06T 19/003* (2013.01); *G06T 15/30* (2013.01); *G01C 21/00* (2013.01)
USPC ............... 701/10; 701/3; 701/14; 340/979; 340/973; 340/945; 340/949

(58) Field of Classification Search
None
See application file for complete search history.

(56) References Cited

U.S. PATENT DOCUMENTS

| | | | | |
|---|---|---|---|---|
| 7,194,342 | B1 * | 3/2007 | Horvath et al. | 701/3 |
| 7,605,719 | B1 * | 10/2009 | Wenger et al. | 340/974 |
| 7,965,223 | B1 * | 6/2011 | McCusker | 342/29 |
| 8,400,330 | B2 * | 3/2013 | He et al. | 340/960 |
| 8,493,241 | B2 * | 7/2013 | He | 340/977 |
| 2007/0085707 | A1 * | 4/2007 | Wyatt | 340/979 |
| 2010/0250030 | A1 * | 9/2010 | Nichols et al. | 701/7 |
| 2012/0133529 | A1 * | 5/2012 | He | 340/977 |

FOREIGN PATENT DOCUMENTS

EP     2128732 A1 * 12/2009

* cited by examiner

*Primary Examiner* — John R Olszewski
*Assistant Examiner* — Jeffrey Boomer
(74) *Attorney, Agent, or Firm* — Donna P. Suchy; Daniel M. Barbieri (57) ABSTRACT

Present novel and non-trivial systems and methods for positioning a heading-based image within a track-based image and for generating steering commands for a forward-looking image capture device of an enhanced vision system ("EVS"). The positioning system is comprised of a source of navigation data, a source of first image data representative of a track-based image, a source of second image data representative of a heading-based image, and an avionics system processor ("ASP") configured to receive the navigation data, the first image data, and the second image data, determine image positioning data, and merge the first image data with the second image data as a function of the image positioning data. The steering commands generating system is comprised of a source of navigation data, the ASP configured to generate steering command data commensurate to a wind correction angle, and the EVS configured to receive the steering data.

17 Claims, 9 Drawing Sheets

SYSTEMS AND METHODS FOR POSITIONING A HEADING-BASED IMAGE WITHIN A TRACK-BASED IMAGE AND FOR GENERATING STEERING COMMANDS TO A STEERABLE FORWARD-LOOKING IMAGE CAPTURE DEVICE OF AN ENHANCED VISION SYSTEM

BACKGROUND OF THE INVENTION

1. Field of the Invention

This invention pertains generally to the field of aircraft display units that present flight information to the pilot or flight crew of an aircraft.

2. Description of the Related Art

It is well-known that a Synthetic Vision System ("SVS") may generate image data representative of a synthetic, three-dimensional perspective of a heading-based scene in front of the aircraft. When provided to a display system, the synthetic image could be presented on the screen of a display unit. Also, it is well-known that an Enhanced Vision System ("EVS") may generate image data representative of the real-world as an enhanced image of the heading-based scene in front of the aircraft, where such image data has been acquired by one or more fixed or steerable forward-looking image capture devices. When provided to the display system, the enhanced image could be presented on the screen of the display unit. Also, as disclosed by Wenger et al in U.S. Pat. No. 7,605,719, image data from both the SVS and EVS may be combined to form a combined SVS-EVS image that could be presented on the display unit.

Unlike the heading-based synthetic image, a track-based synthetic image (i.e., a synthetic image based on the ground track of the aircraft and not the heading) may have an operational advantage when used in conjunction with Highway-in-the-Sky ("HITS") symbology. If the aircraft is flying within the HITS, it will be centered within the synthetic image. Also, a Flight Path Vector ("FPV") symbology may be "clamped" laterally to the center of the synthetic image. The use of the track-based synthetic image could also prevent the unwanted intrusion of the HITS and FPV symbologies into other symbologies (e.g., a speed tape or an altitude tape) when strong crosswinds are present.

The EVS may employ fixed forward-looking image capture devices that are oriented with the heading of the aircraft. When a heading-based SVS image is combined with a heading-based EVS image, there is no misalignment of the images due to crosswinds. When a track-based image is combined with a heading-based image, there is no-misalignment of the images if there is no crosswind; however, in the presence of a crosswind, the alignment between the two images will be lost because a track-based image is referenced to the ground track and the heading-based image is referenced to the heading, As such, there will be a misalignment between the two images resulting in an inconsistent and invalid representation of the track-based scene in front of the aircraft.

BRIEF SUMMARY OF THE INVENTION

The embodiments disclosed herein present novel and non-trivial systems and methods for positioning a heading-based image within a track-based image and for generating steering commands for a forward-looking image capture device of an EVS based upon a wind correction angle. The positioning of the heading-based image within a track-based image could prevent misalignments between the two images, and the steering commands could change a heading-based image into a track-based image when the sensor(s) are steered to align with the ground-track.

In one embodiment, a system is disclosed for positioning a heading-based image within a track-based image. The system could be comprised of a source of navigation data, a source of first image data, a source of second image data, and an avionics system processor ("ASP") configured to receive the navigation data, receive the first and second image data, determine image positioning data, and merge the first image data with the second image data to produce third image data. The source for providing the first image data could be comprised of an SVS, and the source for providing the second image data could be comprised of an EVS. The disclosed system could also be comprised of a display system configured to receive the third image data provided by the ASP and present an image represented therein on a display unit such as a Head-Up Display ("HUD") unit and/or a Head-Down Display ("HDD") unit. The ASP could be a processor of the source of navigation data, the source of first image data, the source of second image data, and/or the display system.

In another embodiment, a method is disclosed for positioning a heading-based image within a track-based image. The disclosed method may be comprised of receiving navigation data, receiving first and second image data, determining image positioning data, and merging the first image data with the second image data as a function of the image positioning data to produce third image data. The navigation data may be representative of a measurement of aircraft direction. The first and second image data could be representative of track-based and heading-based images, respectively. The image positioning data could be determined as a function of the navigation data, a field of view ("FOV") of the first image data, a FOV of the second image data, and a reference position of the first image data. The third image data could be representative of a merged image comprised of a merged track-based image and a merged heading-based image, where the position of the merged heading-based image within the merged track-based image is dependent upon each measure of aircraft direction.

In another embodiment, a system is disclosed for generating a steering command for a forward-looking image capture device. The system could be comprised of a source of navigation data, an ASP, and an EVS. The ASP could be configured to receive the navigation data, generate steering data, and provide the steering data to the EVS. The EVS could be configured to receive the steering data and provide the steering data to one or more forward-looking image capture devices, where each such device could be steered in response to and in compliance with the steering command, whereby each device is set to acquire image data in the direction of the ground track of the aircraft.

In another embodiment, a method is disclosed for generating a steering command for a forward-looking image capture device. The disclosed method could be comprised of receiving navigation data, generating steering data, and providing the steering data to the EVS. The steering data could be generated as a function of the navigation data and be representative of a steering command that is commensurate to a wind correction angle.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
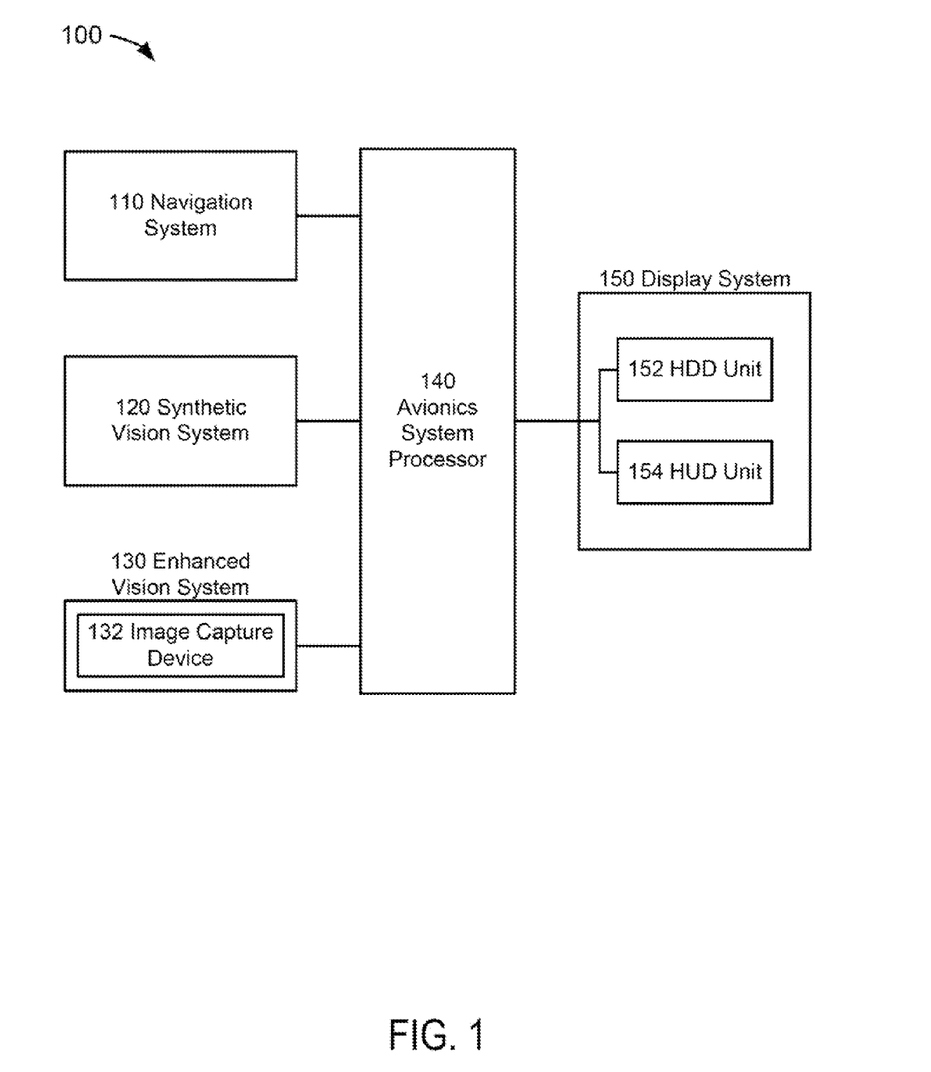
FIG. 1 depicts a block diagram of both an image positioning system and a steering command generating system.

FIG. 1A depicts a block diagram of a system 100 suitable for implementation of the techniques described herein. The system 100 of an embodiment of FIG. 1 may be comprised of a navigation system 110, a synthetic vision system ("SVS") 120, an enhanced vision system ("EVS") 130, an avionics system processor ("ASP") 140, and a display system 150.

In an embodiment of FIG. 1, the navigation system 110 could be comprised of any source(s) which provides data representative of aircraft information, where such information could be comprised of, but not limited to, heading, ground track, wind correction angle information, horizontal position, vertical position, pressure altitude, horizontal velocity (e.g., ground speed), vertical velocity, horizontal position accuracy, vertical position accuracy, horizontal velocity accuracy, vertical velocity accuracy, and/or ownship intended flight path information. It should be noted that data, as embodied herein for any source or system in an aircraft including the navigation system 110, could be comprised of any analog or digital signal, either discrete or continuous, which could contain information. As embodied herein, data and signals are treated synonymously. Aircraft could mean any vehicle which is able to fly through the air or atmosphere including, but not limited to, lighter than air vehicles and heavier than air vehicles, wherein the latter may include fixed-wing and rotary-wing vehicles.

The navigation system 110 may include, but is not limited to, an air/data system, an attitude heading reference system, an inertial guidance system (or inertial reference system), a global navigation satellite system (or satellite navigation system), and/or a flight management system ("FMS") (which is comprised of, in part, a database), all of which are known to those skilled in the art. As embodied herein, the navigation system 110 may provide navigation data to the ASP 140 for subsequent processing as discussed herein.

The SVS 120 may be any system, sub-system, or component thereof which could generate synthetic image data representative of a three-dimensional perspective of the scene in front of the aircraft on a two-dimensional display unit of an aircraft's indicating system. The SVS 120 may receive data representative of aircraft location, attitude, and ground track; retrieve terrain data based upon the navigation data; and generate a synthetic image indicative of the three-dimensional perspective of the scene with a field of view that is referenced to, centered on, and/or coinciding with the direction of the ground track of the aircraft. As embodied herein, the SVS 120 may provide synthetic image data to the ASP 140 for subsequent processing as discussed herein.

The EVS 130 may be any system, sub-system, or component thereof which could generate enhanced image data representative of a real-world image of the scene outside the aircraft that is acquired by one or more fixed or steerable forward-looking image capture devices 132 that are mounted to an aircraft. Image capture devices 132 could be "active sensors" and/or "passive sensors." Examples of active sensors include those used Millimeter Wave Radar systems, and examples of passive sensors include infrared cameras for detecting infrared radiation emanating from the scene or low-light, non-visible, near-infrared radiation such as that emitted from many runway and landing lights in the scene. The EVS 130 is a system known to those skilled in the art and may provide enhanced image data to the ASP 140 for subsequent processing as discussed herein. In addition, the EVS 130 may receive steering data representative of a steering command from the ASP 140, where each steerable forward-looking image capture device may be steered in response to and in compliance with the steering command as discussed herein.

In an embodiment of FIG. 1, the ASP 140 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The ASP 140 may be driven by the execution of software or computer instruction code containing algorithms developed for the specific functions embodied herein. The ASP 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the ASP 140 could be a processor(s) used by or in conjunction with any other system of the aircraft including, but not limited to, the navigation system 110, the SVS 120, the EVS 130, and the display system 150, or any combination thereof.

The ASP 140 may be programmed or configured to receive as input data representative of information obtained from various systems and/or sources including, but not limited to, the navigation system 110, the SVS 120, and/or the EVS 130.

As embodied herein, the terms "programmed" and "configured" are synonymous. The ASP 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a wired data bus or through a wireless network. The ASP 140 may be programmed or configured to execute one or both of the methods discussed in detail below and provide output data to various systems and/or units including, but not limited to, the display system 150.

In an embodiment of FIG. 1, the display system 150 may include, but is not limited to, one or more tactical display unit(s) comprising a Head-Down Display ("HDD") unit 152 and/or a Head-Up Display ("HUD") unit 154. The HDD unit 152 and/or the HUD unit 154 may display an image from data produced by one or more vision systems such as, but not limited to, an SVS, an EVS, or a combined SVS-EVS. The HDD unit 152 is typically a unit mounted to an aircraft's flight instrument panel located in front of a pilot and below the windshield and the pilot's field of vision, and the HUD unit 154 provides tactical information to the pilot or flight crew, in the pilot's forward field of view through the windshield, eliminating transitions between head-down and head-up flying.

Figure 2:
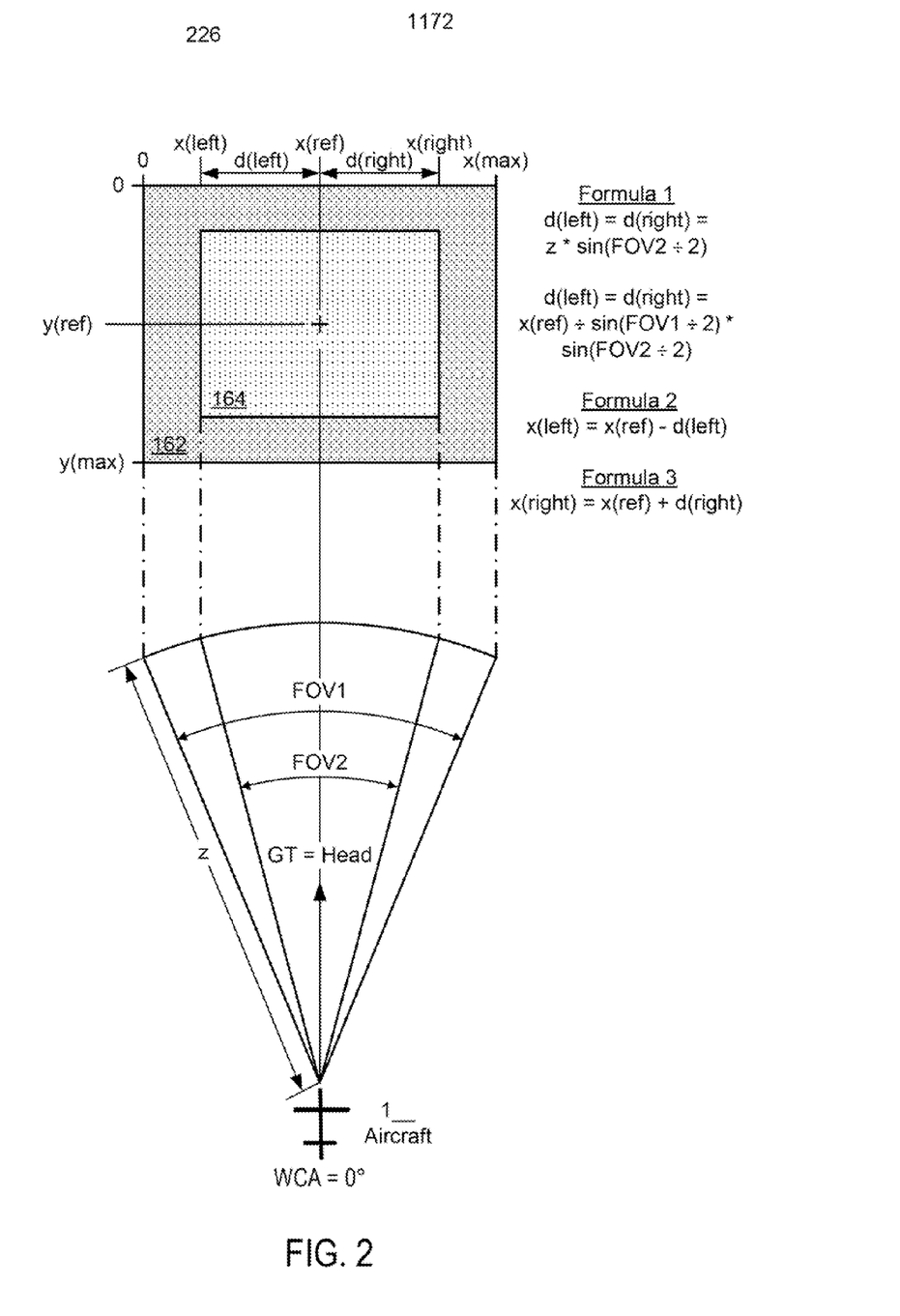
FIG. 2 illustrates a first lateral field of view and a second, coinciding lateral field of view of the scene in front of the aircraft.
Figure 3A:
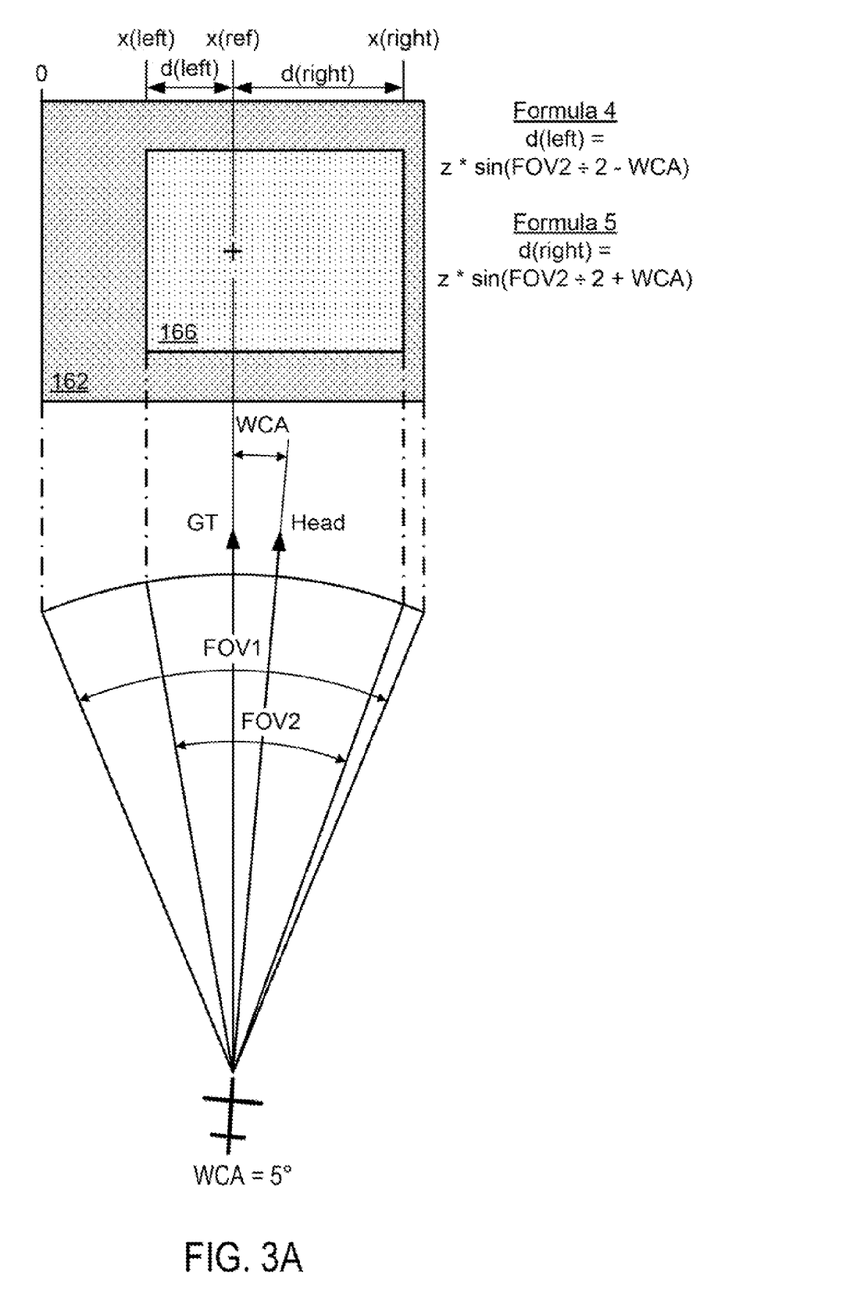
FIG. 3A depicts a first illustration of a first lateral field of view and a second, non-coinciding lateral field of view of the scene in front of the aircraft where the wind correction angle ("WCA") is 5 degrees.
Figure 3B:
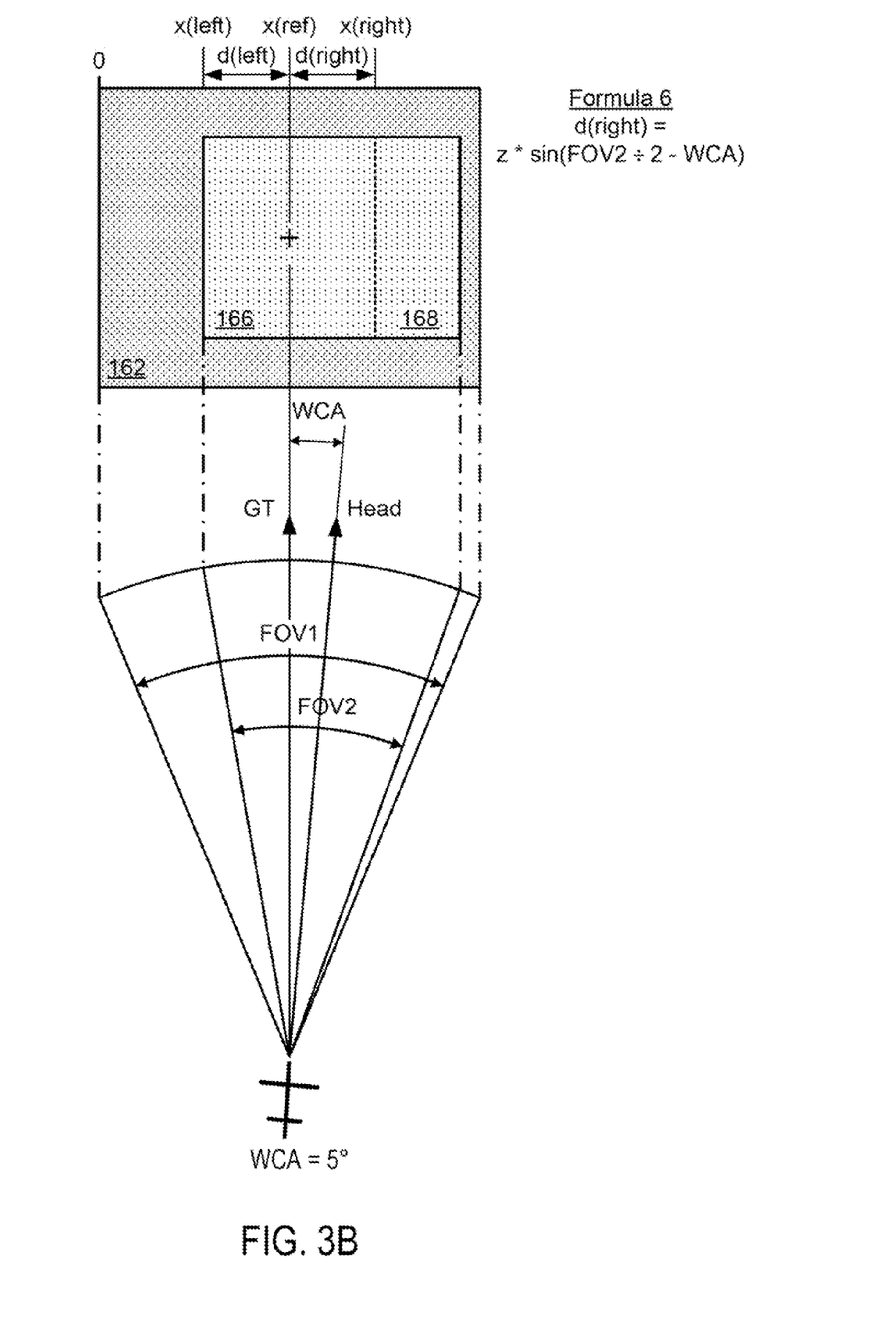
FIG. 3B depicts a second illustration of the first lateral field of view and the second, non-coinciding lateral field of view of FIG. 3A.
Figure 3C:
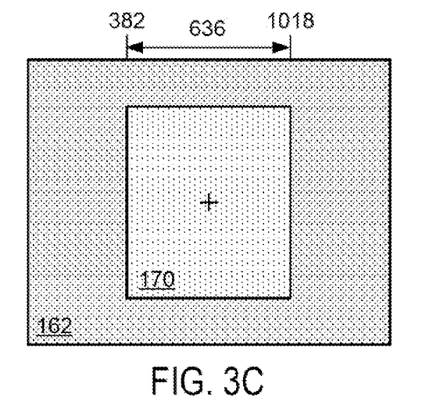
FIG. 3C depicts a third illustration of the first lateral field of view and the second, non-coinciding lateral field of view of FIG. 3A.

The advantages and benefits of the embodiments discussed herein may be illustrated in the drawings of FIGS. 2 through 4, inclusive, by showing how a heading-based image may be positioned within a track-based image to accommodate a split between the aircraft's heading and aircraft's ground track. FIG. 2 illustrates a first lateral field of view ("FOV1") and a second lateral field of view ("FOV2") of the scene in front of the aircraft. Those skilled in the art understand that an FOV may be used in the generation of egocentric images, and that the FOV may be configurable by a manufacturer and/or end-user. In the discussion that follows, the FOV1 will correspond to a track-based image 162 configured for 45 degrees; for the FOV2, it will correspond to a heading-based image 164 configured for 30 degrees. The aspect ratio ("AR") of the track-based image 162 will be assumed to be 4:3, and the size will be 1400 pixels wide by 1050 pixels high (which could also be the screen size of a display unit). The upper left-hand corner will serve as the pixel mapping origin (x(min), y(min)), and the plus sign depicts the center of the track-based image 162 at (x(ref), y(ref)). For the purpose of discussion and the calculations discussed below, location (x(ref), y(ref)) will be assumed to be (700, 525).

The position of a heading-based image within a track-based image may depend upon the measure of wind correction angle ("WCA"). In the embodiment of FIG. 2, a WCA of zero degrees is shown; that is, the aircraft's ground track ("GT") and heading ("Head") are equal. As such, the bisecting lines of both the FOV1 and FOV2 coincide, and the two images are vertically aligned. Also, the distances d(left) and d(right) to left and right of x(ref), respectively, are equal. Referring to Formula 1, d(left) and d(right) may be determined as a function of variable z and FOV2, where z is determined as a function of x(ref) and FOV1. Plugging the values of 700, 30 degrees, and 45 degrees into Formula 1 and rounding to the nearest integer, d(left) and d(right) equal 473. Then, x(left) and x(right) may be determined. Plugging the values of 700, 227, and 1173 into Formulas 2 and 3, x(left) equals 227 and x(right) equals 1173. This means that the lateral boundaries of the heading-based image coincide with pixel columns 227 and 1173 when the WCA equals zero, and the width of the image is 946 pixel columns.

In the embodiments of the drawings of FIGS. 3 and 4, the aircraft's ground track and heading are not equal. In the drawings of FIG. 3, the WCA is 5 degrees. As such, the bisecting lines of both the FOV1 and FOV2 no longer coincide; instead, the direction of the FOV2 bisecting line (which coincides with heading vector) is five degrees to the right of the FOV1 bisecting line (which coincides with the ground track vector). Because the track-based image 162 is referenced to the ground track and the heading-based image 166 is referenced to the heading, the two images are no longer aligned. As such, there will be a misalignment between the two images resulting in an inconsistent and invalid representation of the track-based scene in front of the aircraft.

To prevent a misrepresentation of the track-based scene in front of the aircraft, the heading-based image will have to be positioned by a distance determined as a function of ground track. This means that the distances d(left) and d(right) to left and right of x(ref), respectively, will have to be determined by an amount corresponding to the ground track. Referring to FIG. 3A, d(left) and d(right) may be determined as a function of x(ref), FOV1, FOV2, and WCA (z is determined as a function of x(ref) and FOV1). Plugging the values of 700, 45 degrees, 30 degrees, and 5 degrees into Formulas 4 and 5, d(left) and d(right) equal 318 and 626, respectively. This means that there has been a lateral shift in the image to the right. Then, x(left) and x(right) may be determined using Formulas 2 and 3. Plugging in the applicable values, these formulas produce an x(left) and an x(right) equaling 382 and 1326 respectively. This means that the lateral boundaries of the heading-based image coincide with pixel columns 382 and 1326 when the WCA equals five, and the width of the image is 944 pixels. As such, the width of the image has shrunk by 2 pixel columns with the movement from the centered position (when the WCA equals zero).

In an alternative embodiment (not shown), the width of the heading-based image could be fixed and not decreased. In such an embodiment, the image data could be expanded by adjusting the scale with a multiplier of 1.002119 (946÷944). For the fixed-width, heading-based image, the lateral shift of 153 pixels would result with lateral boundaries coinciding with pixel columns 381 and 1327.

In an embodiment shown in FIG. 3B, a manufacturer and/or end-user has chosen a configuration in which the heading-based image remains centered within the track-based image; that is, the image retains lateral symmetry about x(ref). This configuration could be desirable to avoid an overlap between the heading-based image and symbologies to the left or right of the heading-based image. To retain symmetry about x(ref), the image may be cropped so that the distances d(left) and d(right) to left and right of x(ref), respectively, will equal each other; that is, the portion of the image that will be removed is shown as item 168 (to the right of the dashed line). This means that a decrease in one distance will have to produce an equal amount of decrease in the other distance. Generally, this means that two pixel columns will have to be removed for every pixel column of movement towards the center (except to account for the shrunken width of the image resulting from the increase of the WCA).

Figure 4A:
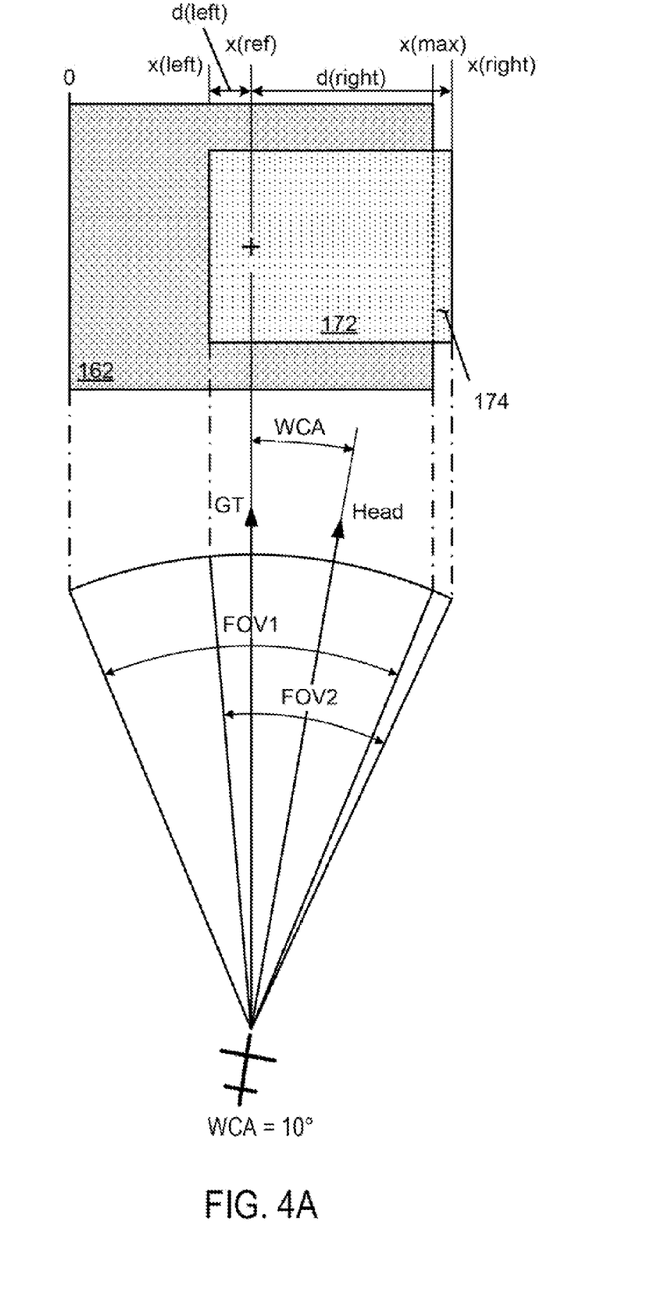
FIG. 4A depicts a first illustration of a first lateral field of view and a second, non-coinciding lateral field of view of the scene in front of the aircraft where the WCA is 10 degrees.

Referring to FIG. 3B, d(right) has decreased instead of increasing as shown in FIG. 4A. Plugging the values of 700, 45 degrees, 30 degrees, and 5 degrees into Formula 6, d(right) equals 318 which is the same as d(left). Plugging this result into Formula 3, x(right) equals 1018. This means that the width of the removed portion of the image 168 is 308 pixel columns (1326−1018). Referring to FIG. 3C, the width of the resulting cropped heading-based image 170 is 636 pixel columns.

Figure 4B:
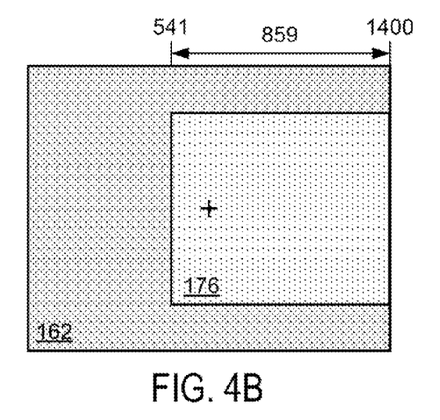
FIG. 4B depicts a second illustration of the first lateral field of view and the second, non-coinciding lateral field of view of FIG. 4A.

In addition to the use of cropping to create a heading-based image centered with the track-based image, it may also be required where the heading-based image 172 goes outside of the track-based image 162 as shown in FIG. 4A where the WCA is 10 degrees. Referring to FIG. 4A and using Formulas 4 and 5, d(left) and d(right) may be determined. Plugging the values of 700, 45 degrees, 30 degrees, and 10 degrees into Formulas 4 and 5, d(left) and d(right) equal 159 and 773, respectively. Then, x(left) and x(right) may be determined using Formulas 2 and 3. Plugging in the applicable values, these formulas produce an x(left) equaling 541 and x(right) equaling 1473. Here, x(right) exceeds 1400, the maximum width x(max) of the tracked-based image. The difference between x(right) and x(max) is 73. This means that 73 pixel columns will be removed during cropping (to the right of the dashed line). Referring to FIG. 4B, the width of the resulting, cropped heading-based image 176 is 859 pixel columns.

Figure 4C:
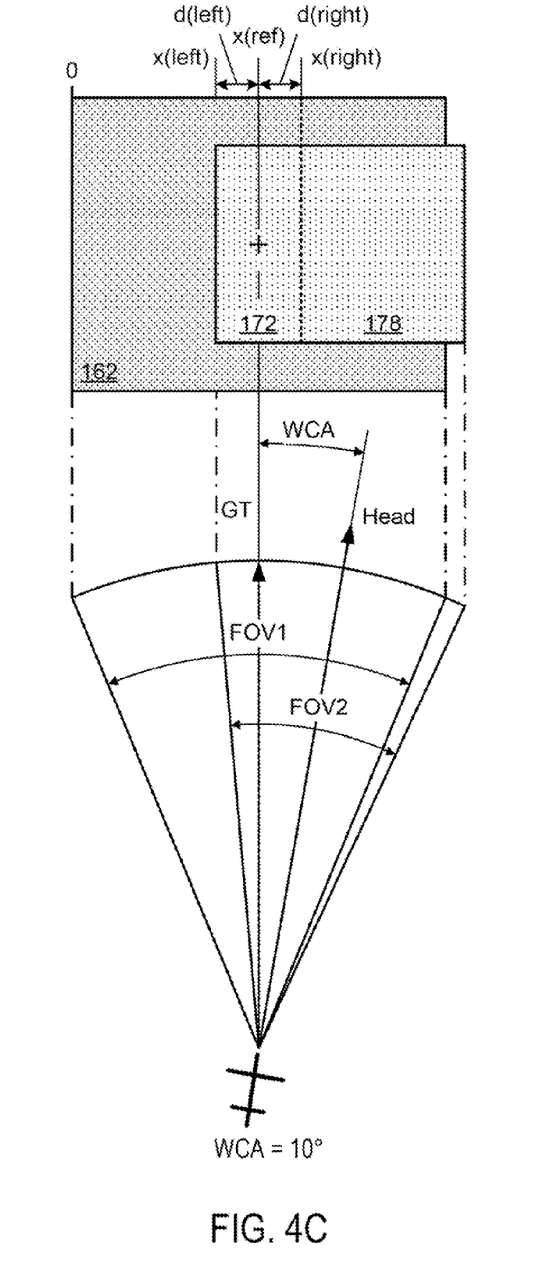
FIG. 4C depicts a third illustration of the first lateral field of view and the second, non-coinciding lateral field of view of FIG. 4A.
Figure 4D:
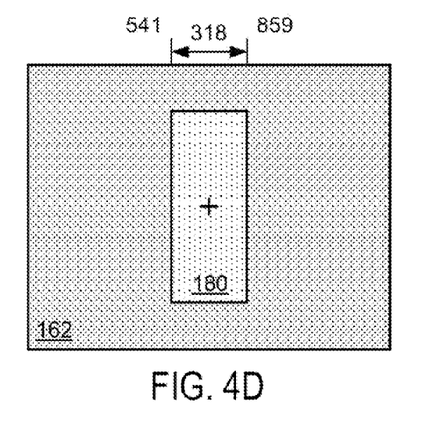
FIG. 4D depicts a fourth illustration of the first lateral field of view and the second, non-coinciding lateral field of view of FIG. 4A.

The embodiment of FIG. 4C is similar to the embodiment of FIG. 3B. In FIG. 4C, a manufacturer and/or end-user has chosen a configuration in which the heading-based image 172 remains centered within the track-based image 162 when the ground track and heading are not equal. This means that heading-based image 172 may be cropped by removing the portion of the image shown as item 178 (to the right of the dashed line). Plugging the values of 700, 45 degrees, 30 degrees, and 10 degrees into Formula 6, d(right) equals 159 which is the same as d(left). Plugging this result into Formula 3, x(right) equals 859. This means that the width of the removed portion of the image 178 is 614 pixel columns (1473–859). Referring to FIG. 4D, the width of the resulting, cropped heading-based image 180 is 318 pixel columns.

Figure 5:
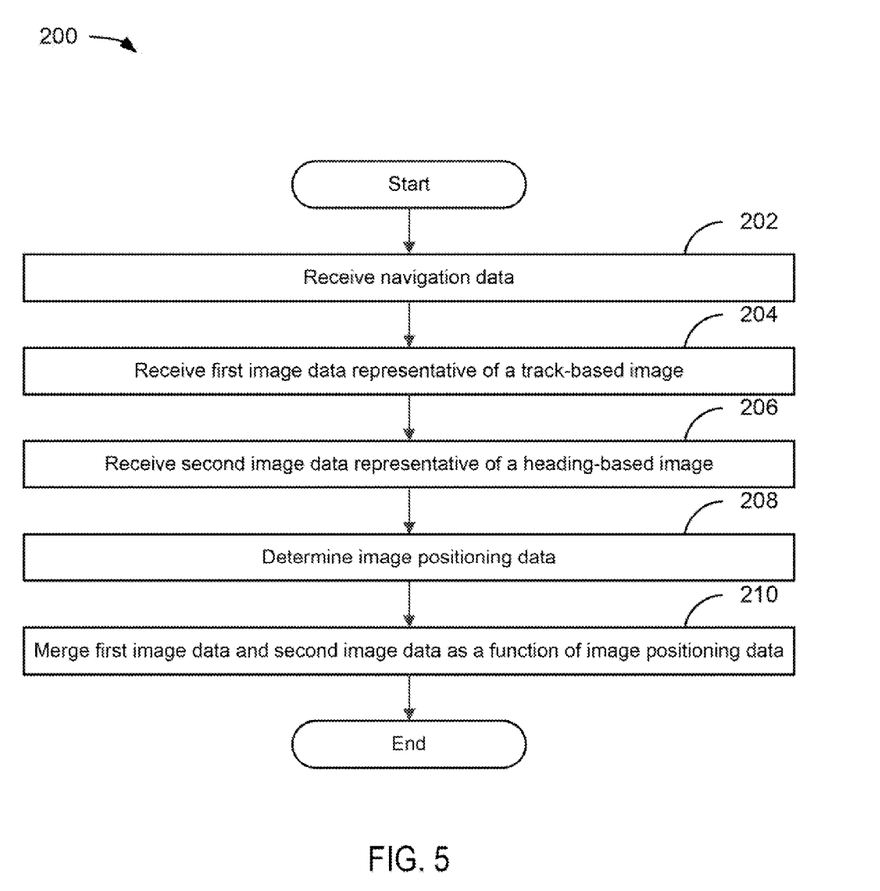
FIG. 5 depicts a flowchart of a method for positioning a heading-based image within a track-based image.
Figure 6:
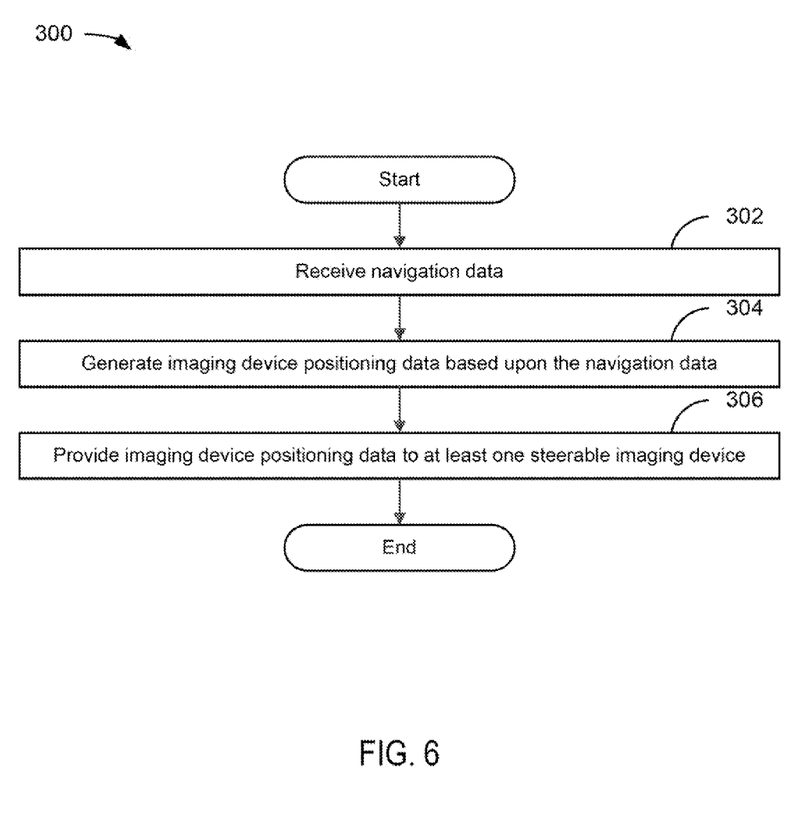
FIG. 6 depicts a flowchart of a method for generating steering commands for a forward-looking image capture device of an EVS.

FIGS. 5 and 6 depict flowcharts 200 and 330, respectively, providing examples for positioning a heading-based image within a track-based image and positioning a forward-looking image capture device, where the ASP 140 may be programmed or configured with instructions corresponding to the following modules. As embodied herein, the ASP 140 may be a processor of a module such as, but not limited to, a printed circuit card having one or more input interfaces to facilitate data communications with the ASP 140, i.e., the receiving and providing of data. As necessary for the accomplishment of the following modules embodied in FIGS. 5 and 6, the receiving of data is synonymous and/or interchangeable with the retrieval of data, and the providing of data is synonymous and/or interchangeable with the making available, supplying, and/or sending of data.

The method of flowchart 200 begins with module 202 with the receiving of navigation data representative of one or more measurements of aircraft direction. In one embodiment, one measurement of aircraft direction could be comprised of information regarding the WCA, where such information could be comprised of the measured value of the WCA and/or an indicator of the direction of the WCA. In another embodiment, measurements of aircraft direction could include aircraft ground track and aircraft heading.

The flowchart continues with module 204 with the receiving of track-based image data representative of a track-based image. The track-based image could be the image located in the scene in front of the aircraft, where the scene is referenced to the ground track of the aircraft. As embodied herein, the first image data could have been generated by an SVS as a function of the ground track of the aircraft.

The flowchart continues with module 206 with the receiving of heading-based image data representative of a heading-based image. The heading-based image could be the image located in the scene in front of the aircraft, where the scene is referenced to the heading of the aircraft. As embodied herein, the heading-based image could have been generated by an EVS from data acquired which is referenced to the heading of the aircraft.

The flowchart continues with module 208 with the determining of image positioning data. As discussed in detail above, the image position data could be determined as a function of the navigation data, the fields of view of the first and second image data, and a reference position of the track-based image data. The image positioning data may be representative of the locations of the lateral boundaries of the heading-based image to be merged with the track-based image.

The flowchart continues with module 210 with the merging of the heading-based image data with track-based image data to produce merged image data representative of a merged heading-based image positioned within a merged track-based image. The merged heading-based image could be the heading-based image represented in the heading-based image data that has been subjected to cropping. Whether or not the heading-based image is cropped may be determined as a function of WCA as discussed in detail above. As discussed above, if the WCA is not zero, a boundary of the heading-based image could be cropped to produce a merged image that is symmetrical about a reference position of the track-based image. Also, a boundary of the heading-based image could be cropped if the WCA exceeds the FOV of the track-based image. Also, a boundary of the heading-based image could be cropped if the boundary reaches a predefined pixel column, beyond which there could be unwanted intrusion of the heading-based image with one or more other symbologies (e.g., a speed tape or an altitude tape). As embodied herein, the function of cropping is configurable by a manufacturer and/or end-user. Then, the method of flowchart 200 proceeds to the end.

The method of flowchart 300 begins with module 302 with the receiving of navigation data representative of one or more measurements of aircraft direction. The statements made above with respect to module 202 may be applied to module 302.

The flowchart continues with module 304 with the generating of imaging device positioning data based upon the navigation data. As embodied herein, the positioning data could be representative of a steering command of one or more forward-looking image capture devices, where each steering command could be comprised of a displacement and the direction of displacement commensurate to the WCA.

The flowchart continues with module 306 with the providing of the imaging device positioning data to one or more forward-looking image capture devices of an enhanced vision system. Upon receiving the positioning data, each forward-looking image capture device could be steered in response to and in compliance with the steering command. As such, each forward-looking image capture device may be set in a position from which image data may be acquired in the direction of the ground track. As embodied herein, a forward-looking image capture device may move by motorized means (e.g., a linear or rotary actuator) or remained fixed (e.g., a phased array antenna) as it is being steered. Then, the method of flowchart 300 proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for positioning a heading-based image within a track-based image, such system comprising:
 a source of navigation data;
 a source of first image data;
 a source of second image data; and
 an avionics system processor configured to
  receive the navigation data representative of a measurement of aircraft direction,
  receive the first image data representative of a first image representing a first track-based scene located outside an aircraft,
  receive the second image data representative of a second image representing a heading-based scene located outside the aircraft,
  determine image positioning data of the second image, and
  merge the first image data with the second image data as a function of the image positioning data to produce third image data, where
   the third image data is
    representative of a third image representing a second track-based scene located outside the aircraft, and
    comprised of at least a partial first image and at least a partial second image, such that
     the position of the partial second image within the third image is dependent upon at least the measurement of aircraft direction.

2. The system of claim 1, wherein the avionics system processor is a processor of the source of navigation data, the source of first image data, the source of second image data, a display system, or any combination of these.

3. The system of claim 1, wherein the measurement of aircraft direction is comprised of wind correction angle information.

4. The system of claim 1, wherein the measurement of aircraft direction is comprised of aircraft heading information and aircraft ground track information.

5. The system of claim 1, wherein the image positioning data is determined as a function of
 the navigation data,
 a field of view of the first image data,
 a field of view of the second image data, and
 a reference position of the first image data.

6. The system of claim 1, wherein the second image is subjected to cropping if a wind correction angle exceeds zero degrees.

7. The system of claim 1, wherein the second image is subjected to cropping if a wind correction angle exceeds a field of view of the first image.

8. The system of claim 1, wherein the second image is subjected to cropping if a boundary of the second image reaches a predefined pixel column.

9. The system of claim 1, further comprising:
 a display system configured to
  receive the third image data from the avionics system processor, where
   the avionics system processor has been further configured to provide the third image data to the display system, and
  present the third image represented in the third image data on the surface of at least one display unit.

10. A method for positioning a heading-based image within a track-based image, such method comprising:
 receiving, using an avionics system processor, navigation data representative of a measurement of aircraft direction;
 receiving, using the avionics system processor, first image data representative of a first image representing first track-based scene located outside an aircraft;
 receiving, using the avionics system processor, second image data representative of a second image representing a heading-based scene located outside the aircraft;
 determining, using the avionics system processor, image positioning data of the second image; and
 merging, using the avionics system processor, the first image data with the second image data as a function of the image positioning data to produce third image data, where
  the third image data is
  representative of a third image representing a second track-based scene located outside the aircraft, and
  comprised of at least a partial first image and at least a partial second image, such that
  the position of the partial second image within the third image is dependent upon at least the measurement of aircraft direction.

11. The method of claim 10, wherein the measurement of aircraft direction is comprised of wind correction angle information.

12. The method of claim 10, wherein the measurement aircraft direction is comprised of aircraft heading information and aircraft ground track information.

13. The method of claim 10, wherein the image positioning data is determined as a function of
 the navigation data,
 a field of view of the first image data,
 a field of view of the second image data, and
 a reference position of the first image data.

14. The method of claim 10, wherein the second image is subjected to cropping if a wind correction angle exceeds zero degrees.

15. The method of claim 10, wherein the second image is subjected to cropping if a wind correction angle exceeds a field of view of the first image.

16. The method of claim 10, wherein the second image is subjected to cropping if a boundary of the second image reaches a predefined pixel column.

17. The method of claim 10, further comprising:
 providing the third image data to at least one display unit, whereby
  the third image is presented on each display unit.

* * * * *